United States Patent [19]

Thornton

[11] Patent Number: 4,732,677

[45] Date of Patent: Mar. 22, 1988

[54] THERMALLY FORMED STACKED DISC FILTER

[75] Inventor: Donald I. Thornton, Warwick, R.I.

[73] Assignee: Allied Corporation, Morristown, N.J.

[21] Appl. No.: 908,442

[22] Filed: Sep. 17, 1986

[51] Int. Cl.⁴ .............................................. B01D 46/02
[52] U.S. Cl. .................................. 210/347; 210/488; 210/508
[58] Field of Search ............... 210/508, 488, 492, 347, 210/486

[56] References Cited

U.S. PATENT DOCUMENTS

| | | | |
|---|---|---|---|
| 2,269,725 | 1/1942 | Malanowski | 210/119 |
| 2,430,078 | 11/1947 | Reinsch et al. | 210/486 |
| 2,472,012 | 5/1949 | Hanneman | 210/185 |
| 2,591,056 | 4/1952 | Ericson | 210/486 |
| 3,251,475 | 5/1966 | Till et al. | 210/508 |
| 3,473,668 | 10/1969 | Bunyard et al. | 210/344 |
| 3,516,542 | 6/1970 | Jaume | 210/168 |
| 3,666,107 | 5/1972 | Boggs et al. | 210/347 X |
| 4,120,794 | 10/1978 | Taylor | 210/345 |

FOREIGN PATENT DOCUMENTS

| | | | |
|---|---|---|---|
| 875647 | 7/1949 | Fed. Rep. of Germany | 210/492 |
| 1047307 | 7/1953 | France | 210/488 |
| 710621 | 6/1954 | United Kingdom | 210/492 |

Primary Examiner—Frank Spear
Attorney, Agent, or Firm—Ken C. Decker; W. N. Antonis

[57] ABSTRACT

A fluid filter is disclosed which consists of a stack of discs which are formed form an air laid, nonwoven batt of randomly arrayed fibers. The batt includes a thermoplastic component to give the disc a self-supporting stiffness when molded. Each of the discs have radially extending contaminant collecting surfaces on the opposite sides thereof, and each have axially offset portions circumscribing the inner and outer diameters of the disc. Alternate disc in the stack are inverted, so that the axially offset portions on the inner and outer circumferences of the disc are brought into registration with one another. Accordingly, radially extending flow paths are defined between the disc to communicate fluid toward and away from the contaminant collecting surfaces. Ribs are provided on the contaminant collecting surfaces to maintain separation of the disc under dynamic flow conditions.

7 Claims, 5 Drawing Figures

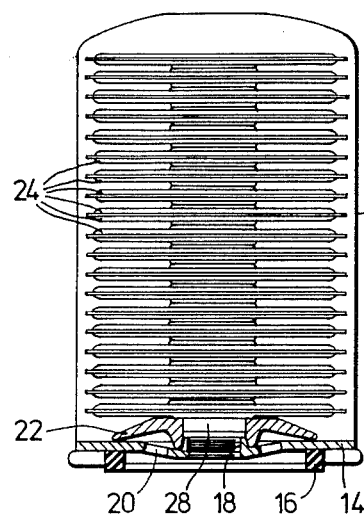
FIG.1
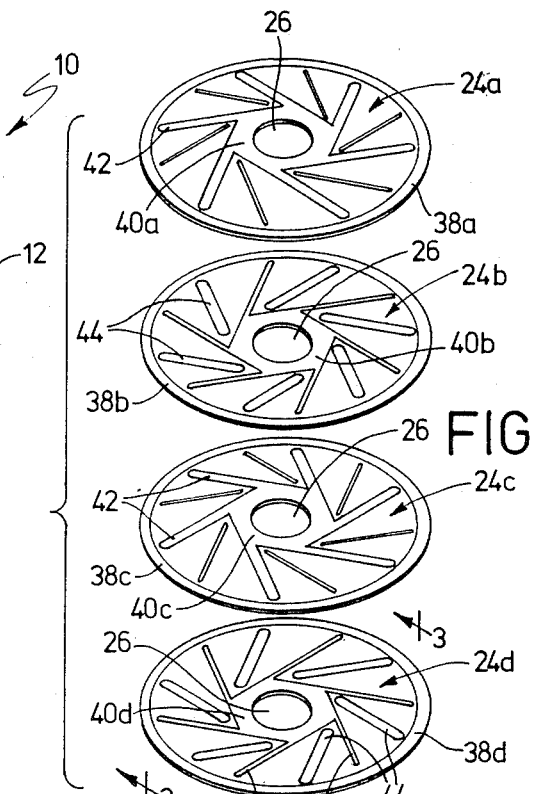
FIG.2
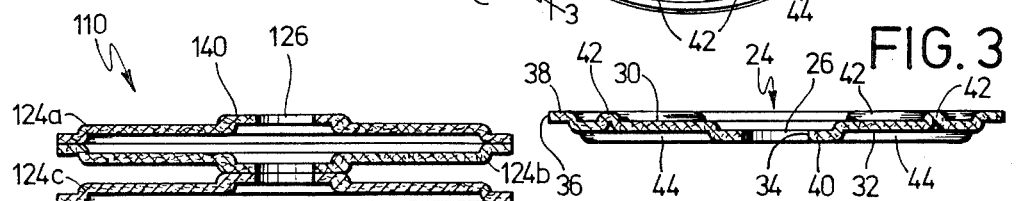
FIG.3
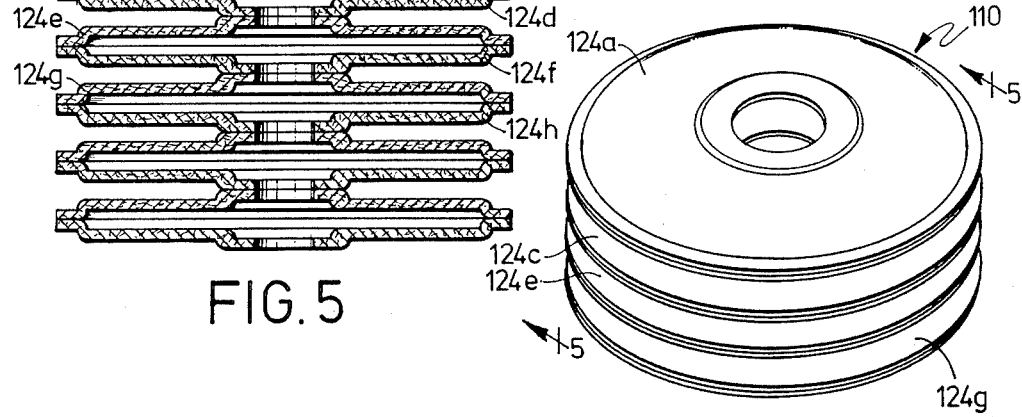
FIG.5
FIG.4

THERMALLY FORMED STACKED DISC FILTER

This application relates to a fluid filter.

Reference is made to copending Application Ser. Nos. 858,785, filed May 2, 1986; 765,782, filed Aug. 15, 1985, now U.S. Pat. No. 4,661,132; and 765,783, filed Aug. 15, 1985, now U.S. Pat. No. 4,636,231. These applications are sometimes referred to collectively herein as the "prior applications".

Liquid filters, such as those used to filter lubricating oil, fuel oils, or gasoline on modern automotive vehicles, and air filters, such as those used to filter induction air in automotive vehicles, are often constructed similarly. Each consists of a filtering media (usually an annular array of radially tapering pleats) which is supported by inner and outer screens and end caps.

It is desirable to reduce the cost of these prior art filters by reducing the number of parts involved, thus not only saving the cost of the parts but also the labor needed to assemble them. Furthermore, it is also desireable to pack as much filtering media as possible into a given space, as the capacity of the filter is governed by the volume of filtering material. Furthermore, it is desirable to assure that initial restriction, that is, the restriction imposed by the filter to fluid flow when the filter is new, be minimized.

The present invention solves the aforementioned difficulties of the prior art by using a filtering medium comprising a stack of discs which are made from a fiberous, batt material of the type disclosed in the prior applications. The batt material contains a thermoplastic component that is heated so that the batt can be molded into a shape-retaining disc. These discs are molded with axial offset portions extending in opposite axial directions, and are alternately stacked such that every other disc is inverted to bring its axially extended portion into engagement with a corresponding axially extending portion on adjacent disc on each side. Accordingly, significantally more filtering medium is packed into a given volume than in the prior art pleated paper filters. Furthermore, the cost of a filter made pursuant to the present invention is reduced as compared to prior art filters due to the fact that the batt material is available at a cost lower than that of the pleated paper material and the fact that the screens, end caps, etc. necessary to prior art filters have been eliminated.

These and other advantages of the invention will become apparent from the following description, with reference to the accompanying drawings, in which FIG. 1 is a longititudnal cross-sectional view of a liquid filter made pursuant to teaching of the present invention;

FIG. 2 is an exploded, perspective view of the discs used in the filter of Figure of 1;

FIG. 3 is a cross-sectional view taken substantially along lines 3—3 of FIG. 2;

FIG. 4 is a perspective view of a stacked disc filter element for filtering inlet combustion air in a vehicle engine; and FIG. 5 is a cross-sectional view taken along lines 5—5 of FIG. 4;

Referring now to the drawings, a liquid filter as indicated by the numberal 10 includes a cup-shaped metal housing 12 having a closed end and an open end. The open end of the housing 12 is closed by a conventional tapping plate 14 which carries a circumferentially extending seal 16 which is adapted to sealingly engage the mounting portion of the vehicle engine upon which the filter 10 is mounted to filter the lubricating oil of the engine. The tapping plate 14 further defines a threaded opening 18 that is adapted to be screwed upon the mounting stud carred by the vehicle engine. Circumferentially spaced openings 20 circumscribe the threaded opening for communicating lubricating oil into the housing 12. A conventional antidrainback valve 22 prevents lubricating oil from draining from the housing 12 through the openings 20 when the vehicle engine is turned off. The housing 12 is filled with a filtering media consisting of a stack of discs 24. As can best be seen in FIG. 2, each of the discs 24 includes a central aperture 26 which aligns with the corresponding central aperture in each of the other discs 24. The bottom disc (viewing FIG. 1) is sealed to a grommet 28 which registers with the threaded opening 18, so that the threaded opening 18 communicates with the column defined by the apertures 26 of the discs 24. The opening 26 in the top of the disc (viewing FIG. 1) is sealed to prevent communication of lubricating oil from bypassing the stack of discs 24.

Referring now to FIGS. 2 and 3, each of the discs 24A-24D is made from a batt of an air laid, randomly arrayed fiber mixture which is prepared pursuant to the teachings of the prior applications. As also taught in the prior applications, the batt material includes a thermoplastic component. The thermoplastic component may be a thermoplastic binder fiber which is mixed in with the other staple fibers from which the batt is prepared, or the thermoplastic component may be a thermoplastic resin which is impregnated into the batt after the batt is laid. In any event, the thermoplastic component permits the batt to be molded into the shape illustrated by the discs 24. By at least partially melting the thermoplastic component, the thermoplastic component fuses with the other fibers from which the batt is made, thereby producing a densified, shape retaining structure after the batt is cooled. Accordingly, the batt may be placed in a mold as discussed in the prior applications, and heated pressure applied to the batt in order to form the densified discs 24.

Each of the discs includes an upper (viewing the Figures) radially extending surface 30, an opposite radially extending surface 32, and inner and outer circumferentially extending surfaces 34, 36 which interconnect the radially extending surfaces 30, 32. The surfaces 30-36 define contaminant collecting walls for filtering the fluid filtrate which is communicated through the filter.

The outer circumferentially extending surface 36 includes a radially offset portion 38 which extends circumferentially around the disc 24, and the inner circumferential surface 34 includes a radially offset portion 40 which is offset axially in the axial direction opposite to that in which the portion 38 is offset. As can best be seen in FIGS. 2-4, alternating discs in the stack of discs are inverted to permit engagements of the axially off set portion of one disc with the correspondingly axially offset portion of an adjacent disc, and to prevent engagement of the other offset portion with the correspondingly offset portion of the same adjacent disc. For example, discs 24B and 24D are inverted with respect to discs 24A and 24C. Accordingly, axially offset portion 38A of disc 24A engages corresponding axially offset portion 38B of disc 24B, but because of the axial offsets, axially offset portion 40A of disc 24A is held away from axial offset portion 40B of disc 24B. Similarly axial offset portion 40B engages axial offset portion 40C of disc 24C, but axial offset portion 38B is held away from axial offset portion 38C. Accordingly, axial offset portion 38C engages axial offset portion 38D of disc 24D, but axial offset portion 40C is held away from axial offset portion 40D of disc 24D.

Each of the discs 24 is provided with ribs 42, 44 molded on the opposite surfaces thereof and oriented as illustrated in FIG. 2 of the drawing such that, regardless of the angular orientation of the discs 24 with respect to one another, the ribs 42 will cross one another to thereby prevent the dynamic forces due to fluid flow through the discs to cause the discs to be forced against one another. Accordingly, the ribs 42, 44 maintain fluid passages between the adjacent discs 24 open. The discs are bonded together at the corresponding axially offset portions 38, 40 through the use either of an adhesive or by heat bonding the thermoplastic component contained within the disc to one another, in a manner well known to those skilled in the art.

Accordingly, when lubricating oil is pumped into the circumferentially spaced openings 20 and into the housing 12, the lubricating oil flows through the passages defined between adjacent discs in a generally radial direction and then flows axially through the contaminant collecting walls defined by the radially extending surfaces 30, 32. Accordingly, the contaminants contained within the lubricating oil are collected on the contaminant collecting walls defined by the radially extending surfaces 30, 32. The lubricating oil then communciates through passage 46 to the central apertures 26, where the fluid flows generally downwardly, viewing the figures, and out through the grommet 28 and out of the threaded opening 18 back up to the vehicle engine.

Referring now to the embodiment of FIGS. 4-5, elements substantially the same as corresponding elements in the preferred embodiment retain the same reference characters. The stacked disc filter element generally indicated by the numeral 110 is substantially the same in concept as that of the preferred embodiment, except that the element 110 is primarily intended for the filtration of inlet combustion air for motor vehicles. Discs 124A-124H are provided with axially offset portions 138, 140. These axially offset portions are preferable molded in ring shaped dies as described in the prior Application Ser. No. 765,783. However, the ring shaped dies permit the portion of the batt between the axially offset portions 138, 140 to be relatively unaffected by the molding processes, such that the batt retains its open characteristics and is highly permeable to air flow. Accordingly, the filter 110 provides a depth type filtering media in which contaminant particles are fed in the air stream, which is communicated to the filter in the same way that the absorbent embodiment, are collected throughout the depth of the filter. Air flow through the filter is both axial and radial as indicated by the arrows, in the same manner that liquid filtrate is communicated through the filter illustrated in FIGS. 1-3.

I claim:

1. Fluid filter element for filtering a fluid filtrate comprising a stack of identical discs, said discs being formed from an air laid, nonwoven batt of randomly arrayed fibers, said batt including a thermoplastic component, said thermoplastic component at least partially fusing the fibers of the batt to define a disc having a stable, predetermined, self-supporting shape so that said stack of discs is structurally self-supporting and does not require supporting structural elements other than the discs themselves, said discs being contoured such that when the discs are stacked upon one another a flow path for the filtrate through the discs is defined both radially and axially with respect to the discs, each of said discs defines an axis and each of said discs including opposed, continuous, uninterrupted radially extending surfaces on opposite side thereof, each of said surfaces includes portions offset axially from the remainder of the corresponding radially extending surface, said axially offset portions engaging corresponding portions of adjacent discs to define said flow paths between said discs, one of said axially offset portions extending in one axial direction from the outer circumferential surface of the disc and the other axially offset portion extending in the opposite axial direction from the inner circumferential surface of the disc.

2. Fluid filter element as claimed in claim 1, wherein said discs are annular and have inner and outer circumferential surfaces, said filtrate flowing between the inner and outer surfaces of said discs.

3. Fluid filter as claimed in claim 2, wherein each of said radially extending surfaces of said discs are connected by said inner and outer circumferential surfaces, said surfaces defining contaminant collecting walls for the filtrate communicated thereto by said passages.

4. Fluid filter as claimed in claim 3, wherein each of said discs included ribs on said radially extending surfaces to maintain separation between said discs to maintain said flow paths open.

5. Fluid filter as claimed in claim 1, wherein alternate discs in said stack of discs are inverted to permit engagement of corresponding offset portions on adjacent discs with one another.

6. Fluid filter as claimed in claim 1, wherein each of said discs include axially projecting ribs projecting into said flow paths to maintain the latter open.

7. Fluid filter as claimed in claim 1, wherein each of said discs include axially projecting ribs projecting into said flow paths from said radially extending surfaces to maintain the latter open.

* * * * *